Patented Nov. 24, 1936

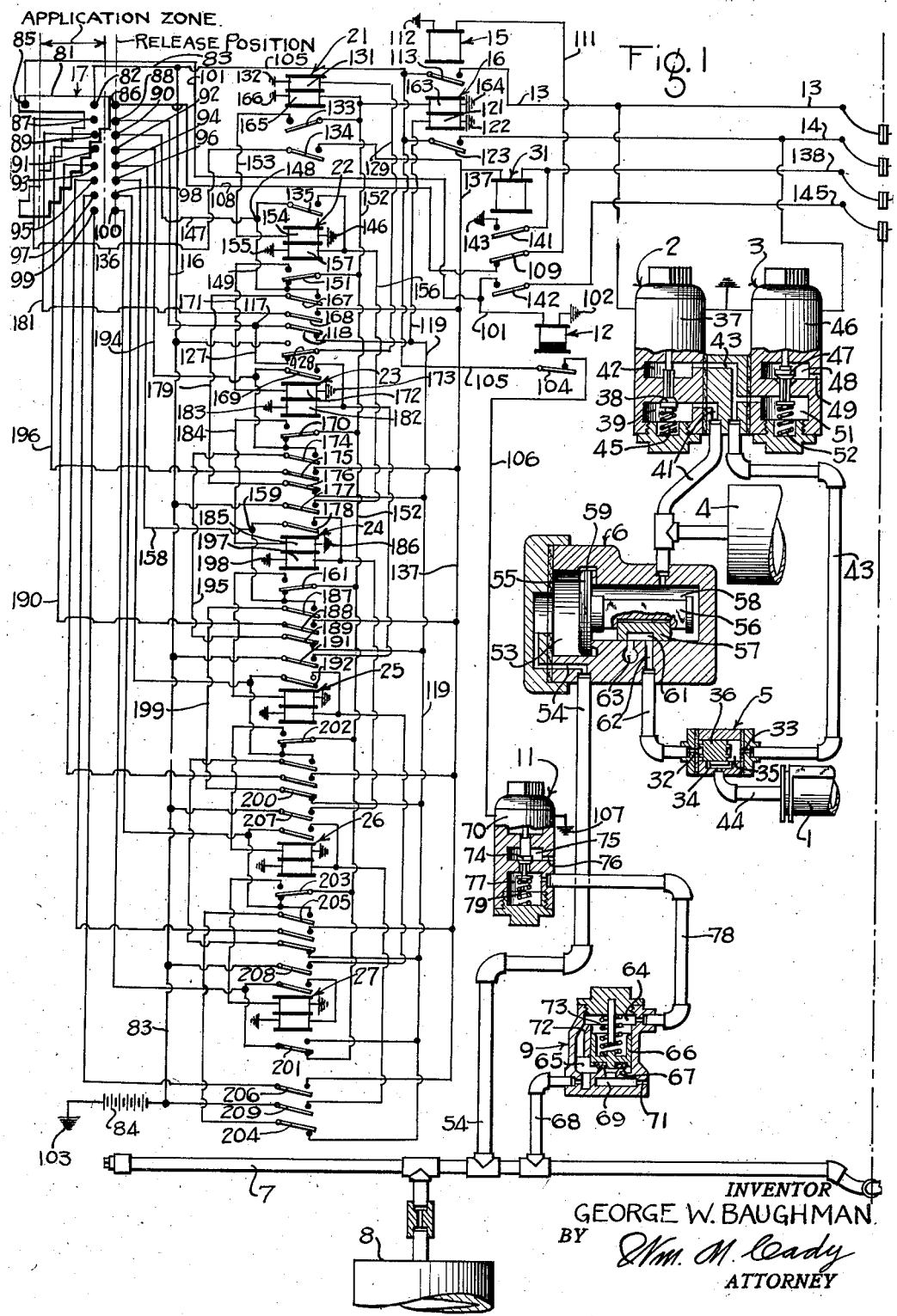

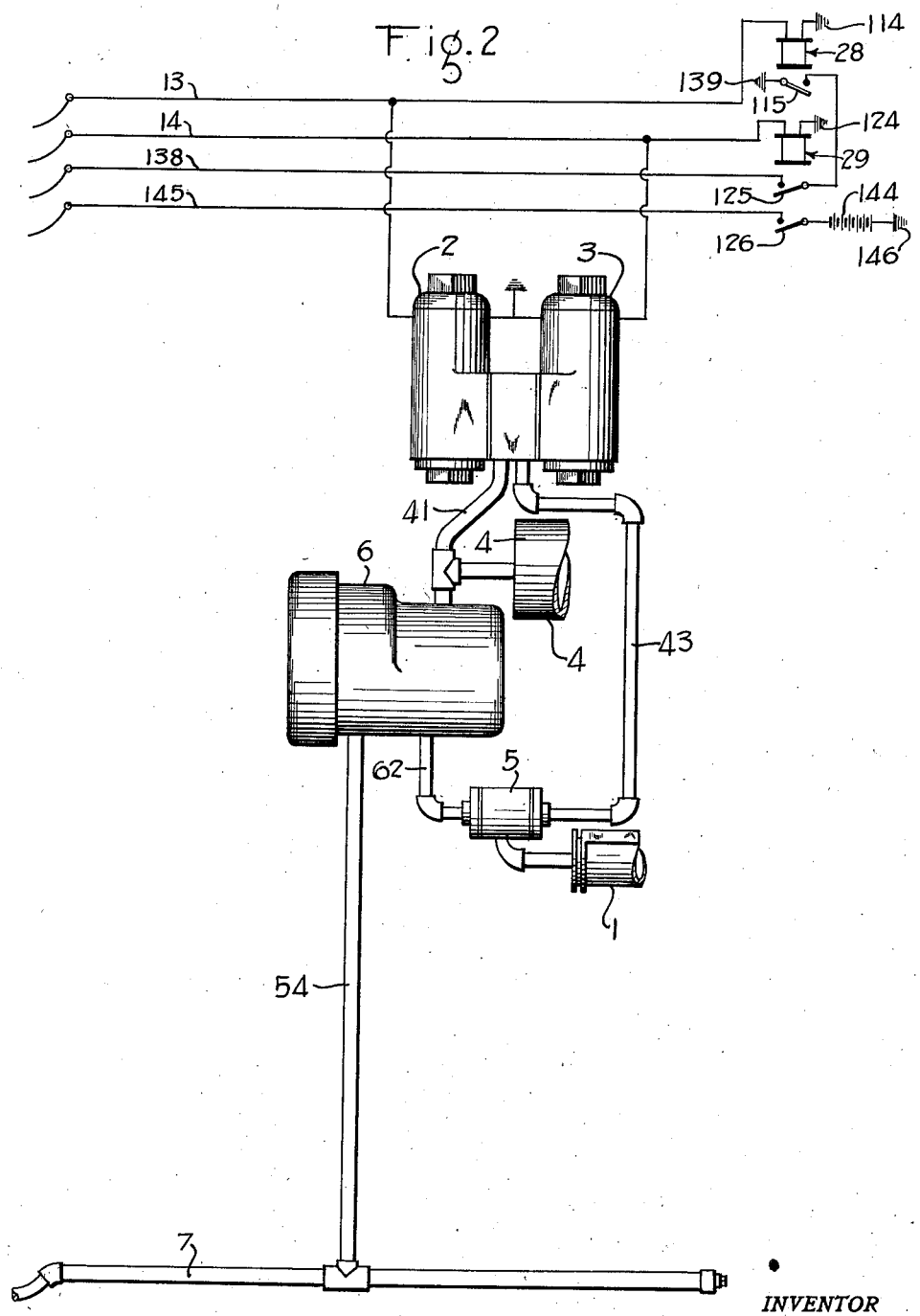

2,061,890

UNITED STATES PATENT OFFICE 2,061,890

ELECTROPNEUMATIC BRAKE

George W. Baughman, Edgewood, Pa., assignor to The Westinghouse Air Brake Company, Wilmerding, Pa., a corporation of Pennsylvania Application December 22, 1934, Serial No. 758,775

20 Claims. (Cl. 303—20)

My invention relates to braking equipment and more particularly to such equipment for use on high speed multiple unit cars and railway trains.

In trains and traction vehicles designed for high speed service it is essential that a braking equipment be provided that combines a high degree of reliability and safety with simplicity of operation. It has previously been proposed to use braking equipment including both electromagnetically controlled means for applying the brakes, and automatic means for applying the brakes that is controlled in accordance with a reduction in brake pipe pressure.

In accordance with my invention, an electropneumatic brake equipment is provided including electrically controlled magnet valve devices that are operated to control the application and release of the brakes in accordance with the positioning of a manually operable brake controlling handle. A plurality of sequence timing relays, corresponding in number to the number of service application positions of the manually operable handle, are provided for controlling the magnet valve devices to effect the degree of application and release of the brakes in accordance with the amount of movement of the brake applying handle from one position to another.

Also, in accordance with my invention, means is provided for checking the proper energization of the circuit controlling wires through which the application magnets and the release magnets are energized, in each position of the brake controlling handle, and for checking the proper operation of the brake controlling sequence timing relays in correspondence to the position of the brake controlling handle. Means is provided, that is operative upon failure in the proper energization of the application magnet controlling wire or of the release magnet controlling wire, to be properly energized, or upon failure of operation of the sequence timing relays in correspondence to the position of the brake controlling handle, to effect a pneumatic emergency application of the brakes.

It is an object of my invention to provide an electropneumatic brake equipment in which the degree of application of the brakes is controlled by the position of a manually operable brake controlling handle, and in which means is provided for checking the integrity of the brake controlling circuits in any application position of the brake controlling handle.

It is another object of my invention to provide an electropneumatic brake equipment in which the degree of application of the brakes is controlled by the operation of a plurality of sequence or chain relays corresponding in number to the number of application positions of the manually operable brake controlling handle and in which means is provided for checking the correctness of operation of the sequence relays to correspond to the positioning of the brake controlling handle.

It is a further object of my invention to provide means, operable upon a failure in the proper energization of the brake controlling wires, or upon improper operation of the sequence relays to effect an automatic emergency application of the brakes.

Other objects and advantages of my invention will appear from the following specification describing a specific embodiment thereof when taken together with the accompanying drawings; in which—

Figs. 1 and 2 taken together, illustrate a diagrammatic view of circuits and apparatus comprising one preferred embodiment of the invention.

Each train unit to which the brakes are applied is provided with a brake cylinder 1, an application magnet valve device 2, and a release magnet valve device 3, for controlling the flow of fluid under pressure from an auxiliary reservoir 4, through a double check valve 5, to the brake cylinder 1, and from the brake cylinder to the atmosphere. A triple valve 6 is also provided for controlling the flow of fluid under pressure from the auxiliary reservoir 4 through the check valve 5 to the brake cylinder 1, and from the brake cylinder 1 to the atmosphere, in accordance with the variations in pressure within a brake pipe 7. Fluid under pressure is supplied from a main reservoir 8, to the brake pipe 7, and through it to the auxiliary reservoirs 4 of the several braking units.

In the drawings, apparatus comprising two brake units is illustrated, although it will be appreciated that any desired number of brake units may be employed. An application valve 9 and an emergency magnet valve device 11 are provided for effecting an emergency release of fluid under pressure from the brake pipe 7 to effect an emergency operation of the triple valve 6 upon the deenergization of a slow time release relay 12, the operation of which will be later explained.

The several application magnet valve devices 2 are operated from an electric circuit that is completed through an application magnet wire 13 in accordance with the operation of an application relay 15, and the several release magnet valve devices 3 are operated from an electric circuit that is completed through a release magnet wire 14 in accordance with the operation of a release relay 16. The relays 15 and 16 are energized in accordance with the operation of a manually operable controller 17 and one or more of a plurality of chain relays 21, 22, 23, 24, 25, 26, and 27 corresponding in number to the number of operative positions of the controller 17 within its application zone, here shown as seven, but which, it will be appreciated, may be any desired number. The operation of the application relay 15 and of the release relay 16 to their circuit closing positions controls the operation, respectively, of an application checking relay 28 and a release checking relay 29, which control the operation of an application limiting relay 31 and which latter effects the continued energization of the slow release relay 12 after the manual controller 17 has been moved away from its release position, in a manner to be later explained.

The check valve device 5 comprises a cylindrical casing having inlet ports 32 and 33 in the opposite ends thereof, and outlet ports 34 and 35 in a side wall thereof, and contains a check valve 36 that, when moved toward the left, closes communication between the inlet port 32 and the outlet 34 and opens communication between the ports 33 and 35, and, when positioned toward the right, closes between the ports 33 and 35 and opens communication between the ports 32 and 34.

The application magnet valve device 2 comprises a magnet 37 that is operatively connected to an application valve 38 to control communication between a valve chamber 39, that is connected by passage and pipe 41 to the auxiliary reservoir 4, and the chamber 42, that is connected by passage and pipe 43 through the check valve device 5 and the brake cylinder pipe 44, to the brake cylinder 1. A spring 45 is provided in the application valve chamber 39 for forcing the application valve 38 to its seat.

The release magnet valve device 3 comprises a magnet 46 that is operatively connected to a release valve 47 for controlling communication between a release valve chamber 48, that is in communication with the atmosphere through the exhaust port 49, and a chamber 51, that is in communication with the brake cylinder 1 through passage and pipe 43 and the check valve 5. A spring 52 is provided in the chamber 51 for urging the release valve 47 from its seat.

The triple valve device 6 comprises a casing containing a piston chamber 53 that is in communication with the brake pipe 7 through passage and pipe 54, and which contains a piston 55 that is provided with a stem 56 that is operatively connected to a slide valve 57 contained within a valve chamber 58. In the illustrated, or release, position of the piston 55 and the valve 57, the auxiliary reservoir 4 is charged from the brake pipe 7 through a groove 59 leading past the piston 55 from the piston chamber 53 to the valve chamber 58, and communication between the passage and pipe 62 and the exhaust port 63 is effected through a groove 61 in the face of the slide valve 57.

Upon a reduction in brake pipe pressure the differential pressure on the opposite sides of the piston 55, causes the piston and the slide valve 57 to move toward the left, closing communication between the pipe and passage 62 and the exhaust port 63, and unlapping the end of the passage 62 to effect communication from the auxiliary reservoir 4 to the brake cylinder 1 through the valve chamber 58 and the inlet port 32 of the double check valve device 5. As fluid under pressure enters the double check valve device 5 through the port 32 the valve 36 will be forced toward the right, closing communication between the ports 33 and 35 and opening communication between the ports 32 and 34. Upon an increase in brake pipe pressure, while the check valve 36 is in its right position, a corresponding increase in pressure within the piston chamber 53 forces the piston 55 and the slide valve 57 to their illustrated positions, effecting communication from the brake cylinder 1 to the atmosphere through the ports 34 and 32 of the check valve device 5 and the exhaust port 63 of the triple valve device 6. In this position of the piston 55, fluid under pressure flows from the main reservoir 8 to the auxiliary reservoir 4 through the feed groove 59, past the piston 55, to again recharge the auxiliary reservoir.

The application valve device 9 for effecting a quick release of fluid under pressure from the brake pipe 7 to the atmosphere, comprises a casing containing chambers 64 and 65, between which is positioned a valve 66 that is adapted to engage a ring seat 67 to close communication from the chamber 65, that is in communication with the brake pipe 7 through the pipe 68, and the exhaust chamber 69, that is in communication with the atmosphere through an exhaust port 71. A restricted passage 72 is provided between the chambers 64 and 65 to normally equalize pressures on the opposite sides of the valve 66. A spring 73 is provided within the chamber 64 for urging the valve 66 to its seat 67.

The emergency magnet valve device 11 comprises an electromagnet 70 operatively connected to a release valve 74, for controlling communication between the chamber 75, that is in open communication with the atmosphere through an exhaust port 76, and a chamber 77, that is in communication with the chamber 64 of the application valve device, through a pipe 78. A spring 79 is provided in the chamber 77 for urging the valve 74 from its seat. So long as the magnet 70 is energized, the release valve 74 is forced to its seat against the pressure of the spring 79, thus closing communication between the chamber 64 of the application valve device 9 and the atmosphere. Upon deenergization of the magnet 70, the emergency release valve 74 is moved from its seat by the pressure of the spring 79, thus effecting communication from the chamber 64 in the upper part of the application valve device 9 to the atmosphere, through the exhaust port 76 of the emergency valve device 11. This effects a rapid reduction in the pressure within the chamber 64, since fluid under pressure cannot be fed from the chamber 65 through the restricted passage 72 fast enough to maintain the pressure within the chamber 64.

Since the valve 66 is subject, on its lower side, to the pressure within the chamber 65, and, on its upper side, to the pressure of the spring 73 and to the pressure within the chamber 64, a reduction in the pressure within the chamber 64 permits the pressure within the chamber 65 to move the valve 66 upwardly against the pressure of the spring 73 thus effecting communication between the chamber 65 and the atmosphere through the exhaust chamber 69 and the exhaust port 71 to effect a rapid reduction in brake pipe pressure. This reduction in brake pipe pressure effects an operation of the triple valve device 6 as above described to effect an emergency application of the brakes.

The manually operable controller 17 for controlling the application and release of the brakes is illustrated as being of the drum type, and comprises a conducting drum segment 81 that is in engagement, in all positions of the controller handle, with a contact member 82, connected by a conductor 83 to the positive terminal of a battery 84. Contact members 85 and 86 are provided, the contact member 85 being in engagement with the drum segment 81 in its release position only, and the contact member 86 being in engagement with the drum segment 81 in all controller positions excepting the release position. As illustrated, the downwardly extending portion of the drum segment 81 consists of a plurality of rectangular portions arranged in a step by step fashion, the number of such portions corresponding to the number of application positions of the controller 17, here illustrated as seven. Seven pairs of contact members 87 to 100 inclusive, numbered 87 and 88 for the first application position and 99 and 100 for the seventh application position, cooperate with the seven rectangular portions of the drum segment 81. The seven pairs of contact members 87—88 to 99—100 control the operation of the seven sequence or chain relays 21 to 27 inclusive, and the operation of the application relay 15, the release relay 16, and the application limiting relay 31, in accordance with the degree of movement of the controller 17.

The chain relays 21 to 27 inclusive, are each provided with two operating windings either one of which, when energized, attracts the armature of the relay, causing the associated contact members to be actuated upwardly as viewed in the drawings. Upon movement of the controller 17 from its release position, the application relay 15 and the release relay 16 are both energized, the application relay remaining energized only for a limited period of time, depending upon the number of the chain relays required to operate in sequence to effect the energization of the application limiting relay 31, and which corresponds to the number of controller steps through which the controller 17 has been moved. At the termination of the operation of the required number of sequence or chain relays, the application limiting relay 31 is energized and operated to interrupt the energization of the application relay 15 and prevent a further degree of application of the brakes.

After an application of the brakes has been made, a movement of the controller 17 toward its release position effects a reverse operation of a number of chain relays, depending upon the number of application positions through which the controller has been moved, during which time the release relay 16 and the release magnet valve device 3 are deenergized.

The operation of the equipment will now be explained in detail for a number of specific operations of the controller 17. The conducting segment 81 of the drum controller is constantly connected to the positive terminal of the battery 84 through the contact member 82 and conductor 83. In the illustrated or release position of the controller 17, a circuit is completed through the contact member 85, conductor 101, the winding of the slow release relay 12, to ground at 102, and to the grounded terminal 103 of the battery 84, thus energizing the slow release relay 12 and causing its contact member 104 to be held in a circuit closing position. The contact member 104, in its circuit closing position, completes a circuit for energizing the magnet 70 of the emergency magnet valve release device 11 extending from the battery 84, through conductors 83 and 105, contact member 104 of the relay 12, conductor 106, the magnet 70, to ground at 107, and to the grounded terminal 103 of the battery 84. So long as the magnet 70 is energized the valve 74 remains seated. Upon movement of the controller 17 from its release position, the contact member 85 and the conducting segment 81 are separated, thus interrupting the above traced circuit through the winding of the slow release relay 12, which is so designed as to remain closed for about one second after the circuit is interrupted, at which time the relay will interrupt the above traced circuit through the magnet 70, unless a circuit has been closed through the lower contact member of the relay 31 to maintain the relay 12 energized.

If, upon movement from its release position, the controller 17 is brought to rest in its first application position, the contact members 82, 86, 87 and 88 will be in engagement with the conducting segment 81. The contact member 82 connects the segment 81 to the ungrounded terminal of the battery 84. A circuit now extends from the conducting segment 81 through the contact member 86, conductor 108, the contact member 109 of the relay 31, conductor 111, the winding of the application relay 15 to ground at 112, and to the grounded terminal 103 of the battery 84, thus energizing the relay 15 and causing it to move its contact member 113 to a circuit closing position. This operation of the relay 15 closes a circuit for energizing the application checking relay 28 that extends from the ungrounded terminal of the battery 84, through conductors 83 and 105, contact member 113 of the relay 15, application magnet conductor 13, the winding of the application checking relay 28, to ground at 114, and to the grounded terminal 103 of the battery 84, thus energizing the relay 28 and causing it to move its contact member 115 to a circuit closing position. A circuit is also completed from the conductor 13 through the winding of the magnet 37 of each application magnet valve device 2, causing the valve 38 to be moved from its seat to effect the supply of fluid under pressure to the brake cylinder 1.

A circuit also extends from the conducting segment 81 through the contact member 88, conductor 116, to the junction point 117, the contact member 118 of the second chain relay 22 is in its deenergized position, conductor 119, the lower winding 121 of the release relay 16, to ground at 122, and to the grounded terminal 103 of the battery 84, thus energizing the release relay 16 and causing it to move its contact member 123 to a circuit closing position. This operation of the release relay 16 closes a circuit extending from the battery 84, through conductor 83, conductor 105, the contact member 123 of the relay 16, the release magnet wire 14, through which the several release magnet valve devices 3 are energized, the winding of the release checking relay 29 to ground at 124, and to the grounded terminal 103 of the battery 84. The completion of this circuit effects the operation of the several release valves 47 to their lap position to cut off the flow of fluid under pressure from the brake cylinder 1 to the atmosphere, and energizes the release checking relay 29, causing it to move its contact members 125 and 126 to their circuit closing positions.

In the first application position of the controller 17 a circuit also extends from the conducting segment 81 through contact member 88, conductor 116 to the junction point 117, conductor 127, the contact member 128 in its lower or illustrated position, conductor 129 to the upper winding 131 of the first chain relay 21, to ground at 132, and to the grounded terminal 103 of the battery 84, thus energizing the relay 21 and causing it to move its several contact members 133, 134 and 135 upwardly to their circuit closing positions. The contact member 134 closes a checking circuit extending from the conducting segment 81 of the controller, through contact member 87, conductor 136, the contact member 134 of the relay 21, conductor 137, the winding of the application limiting relay 31, conductor 138, the contact member 125 of the release checking relay 29, the contact member 115 of the application checking relay 28 to ground at 139, and to the grounded terminal 103 of the battery 84, thus energizing the application limiting relay 31 and causing it to move its contact members 141, 109 and 142 to their circuit closing positions.

The energization of the application limiting relay 31 and the upward movement of its several contact members effects the closure of a holding circuit through the contact member 141 thereof to ground at 143, and to the grounded terminal 103 of the battery 84. The contact member 109 of the relay 31, when moved to its upper position, interrupts the energizing circuit through the winding of the application relay 15, permitting its contact member 113 to drop and interrupt the circuit through the application magnet wire 13 for energizing the several application magnet valve devices 2 and the application checking relay 28. This causes the application magnet valve devices to cut off the supply of fluid under pressure to the cylinders, and movement of the contact member 115 of the checking relay 28 to interrupt the circuit through the conductor 138 that originally energized the winding of the relay 31. The relay 31 is, however, now maintained energized through the holding circuit above traced. Movement of the contact member 142 of the relay 31 to its circuit closing position closes a circuit for energizing the slow release relay 12 that extends from the battery 144, through the lower contact member 126 of the release checking relay 29, conductor 145, contact member 142 of the relay 31, conductor 101, the winding of the slow release relay 12 to ground at 102 and to the grounded terminal 146 of the battery 144.

Upon energization of the first chain relay 21, the contact member 133, when moved to its upper position, connects the contact member 90 of the controller 17 to the grounded terminal 146 of the upper winding of the second chain relay 22, through a circuit extending from the contact member 90, through conductor 147, junction point 148, the contact member 151 of the relay 22 in its lower position, conductor 152, contact member 133 of the relay 21, conductor 153, the winding 154 of the relay 22 to ground at 146 and to the grounded terminal 103 of the battery 84. At the same time the contact member 135 of the relay 21 connects the contact member 90 of the controller 17 to the grounded terminal 155 of the lower winding 157 of the second chain relay 22 through a circuit extending from the junction point 148, contact member 135 of the relay 21, the winding 157 of the relay 22 to ground at 155. Since, however, in the first application position of the controller 17, the contact member 90 is not in engagement with the conducting segment 81, the winding of the second chain relay 22 remains deenergized upon operation of the contact members 133 and 135 of the first chain relay 21 to their circuit closing positions.

It will be noted, that upon movement of the controller 17 to its first application position, the application relay 15 and the release relay 16 are immediately energized and effect the immediate energization of the application magnet valve devices 2 and of the release magnet valve devices 3, the application magnet valve devices 2 remaining energized for a period of time depending upon the time required for operation of the first chain relay 21 and the application limiting relay 31, during which time fluid under pressure is supplied from the auxiliary reservoir 4 to the brake cylinder 1. Each of the chain relays 21 to 27 inclusive, has a time delay characteristic in both its closing and opening operations that is about one-tenth the time delay interval of the slow release relay 12, and since the chain relays operate in sequence, the duration of time between the energization of the application relay 15 and the application limiting relay 31 will depend upon the number of steps through which the controller 17 has been moved and the number of chain relays required to operate to effect the energization of the relay 31.

Should, upon movement of the controller 17 to the first application position as above described, the application relay 15 and the release relay 16 fail to properly energize the application magnet wire 13 and the release magnet wire 14, respectively, or should the first chain relay 21 fail to properly operate, the application limiting relay 31 will not be energized, since its energizing circuit is completed only upon operation of the application checking relay 28, the release checking relay 29, and the chain relay 21 to their circuit closing positions. Consequently, upon the failure to energize the relay 31, the contact member 142 thereof will not be moved to close a circuit through the winding of the slow release relay 12 to maintain it in its circuit closing position. The slow release relay 12 will, therefore, become deenergized after the time interval corresponding to its time delay characteristic, permitting the contact member 104 to interrupt the circuit through the winding of the emergency magnet valve device 11 to effect a reduction in brake pipe pressure as above explained, and an emergency operation of the triple valve device 6.

So long as the controller 17 is maintained in its first application position, the release relay 16 and the application limiting relay 31 are maintained energized, thus maintaining the release magnet valve devices 3 in their lap positions. If the controller 17 is moved from its first application position to its second, third, or any higher, application position, the application relay 31 is deenergized upon movement of the contact member 87 from engagement with the conducting segment 81, thus again effecting the energization of the application relay 15 and the application magnet valve devices 2, which are operated to again supply fluid from the auxiliary reservoirs 4 to the brake cylinders 1 for a duration of time dependent upon the number of application positions through which the controller 17 was moved, and the number of chain relays required to operate before the application limiting relay 31 is again energized to interrupt the energization of the application relay 15. During such forward movement of the controller 17, the upper winding 163 of the release relay 16 and the lower winding 165 of the first chain relay 21 are maintained energized through a circuit that includes the conductor 152, that contact member on the controller 17 that is below the contact member 88 and corresponds to the application position to which the controller 17 was moved, and the uppermost illustrated contact member of the chain relay, corresponding to the controller position, in its deenergized or lower position.

If the controller 17 is moved from its first application position to its release position, the release relay 16 and the first chain relay 21 will be deenergized upon separation of the contact member 88 from the controller conducting segment 81. The operation of the relay 21 to its deenergized position interrupts a circuit through its contact member 134, thus deenergizing the application limiting relay 31.

If the operator moves the controller 17 from its release position, to a position beyond its first application position, say, for example, to its fourth application position, the separation of the contact member 85 from the conducting segment 81 will interrupt the circuit through the winding of the slow release relay 12 in the same manner as when the controller 17 was moved to its first application position, as explained above, and engagement of the contact member 86 with the conducting segment 81 will effect the energization of the application relay 15, the application checking relay 28 and the several application magnet valve devices 2 in the same manner as explained above when the controller 17 was moved to its first application position. In the fourth application position of the controller 17, however, the application limiting relay 31 will not become energized to interrupt the energization of the application relay 16 until the first four of the sequence relays, 21, 22, 23 and 24, have operated in series, thus maintaining the application relay 15, and the application magnet valve devices 2, energized for a period of time four times as long as when the controller 17 was moved to its first application position, in which case the first chain relay 21 only was required to operate before effecting the energization of the application limiting relay 31 and the deenergization of the application relay 15.

In the fourth application position of the controller 17, the contact members 93 and 94 are in engagement with the conducting segment 81, effecting energization of the release relay 16, and of the first chain relay 21, by means of a circuit extending from the conducting segment 81 through contact member 94, conductor 158 to the junction point 159, through the contact member 161 of the chain relay 24, conductor 152, the upper winding 163 of the release relay 16, to ground at 164, and to the grounded terminal 103 of the battery 84, and from the conductor 152 through the winding 165 of the chain relay 21, to ground at 166, and to the grounded terminal 103 of the battery 84. The energization of the release relay 16, causes it to close a circuit through its contact member 123, that effects the energization of the release checking relay 29 and operation to its circuit closing position, and the energization of the first chain relay 21 effects its operation to its circuit closing position.

Movement of the contact member 133 of the first chain relay 21 to its circuit closing position effects the energization of the second chain relay 22 through a circuit extending from the conductor 152 through relay contact member 133, conductor 153, the upper winding 154 of the chain relay 22, to ground at 146, and to the grounded terminal 103 of the battery 84, thus operating the relay 22 to move its several contact members 151, 167, 168, 118, 128 and 169 to their upper positions. Movement of the second contact member 134 of the first chain relay 21 to its circuit closing position connects the controller contact member 87 to the winding of the application limiting relay 31, but since in this position of the controller 17, the contact member 87 is not in engagement with the conducting segment 81, no circuit is completed thereby. Likewise, movement of the contact member 135 to its circuit closing position connects the controller contact member 90 to the lower winding 157 of the second chain relay 22, but since the contact member 90 is not in engagement with the control segment 84 in the fourth application position of the controller 17, no circuit is completed thereby.

Movement of the relay contact member 151 to its upper position interrupts the connection between the conductor 152 and the controller contact member 90, and closes a circuit from the conductor 152 through conductor 171, the upper winding 172 of the third chain relay 23, to ground at 173, and to the grounded terminal 103 of the battery 84, thus energizing the relay 23 and effecting movement of its contact members 170, 174, 175, 176, 177 and 178 to their upper positions. Movement of the contact member 167 of the relay 22 to its circuit closing position, connects the controller contact member 99, through the conductors 147 and 149, the contact member 167 of the relay 22, conductor 179, the contact member 176 of the relay 23, to the conductor 119, but since, in the fourth position of the controller 17, the contact member 90 is not in engagement with the conducting segment 81, the conductor 119 is not energized through this circuit. Likewise, movement of the contact member 168 to its circuit closing position connects the controller contact member 89 through conductor 181 to the conductor 137, but since in this position of the controller, the contact member 89 is not in engagement with the conducting segment 81, no circuit is completed thereby.

Movement of the relay contact member 118 upwardly disconnects the controller contact member 88 from the conductor 119, but since the contact member 88 is not in engagement with the conducting segment 81 in this position of the controller 17, no operative circuit change is made thereby. Movement of the relay contact member 128 upwardly disconnects the conductor 129 from the controller contact member 88, and closes a circuit from the high voltage terminal of the battery 84 through conductor 83, the contact member 128, conductor 129, the upper winding 131 of the first chain relay 21, to ground at 132, and to the grounded terminal 103 of the battery 84, thus maintaining the relay 21 energized upon interruption of the circuit through its winding 165, which takes place upon upward movement of the contact member 161 of the fourth chain relay 24 in a manner to be explained. Movement of the contact member 169 to its circuit closing position connects the controller contact member 92 through the lower winding 182 of the chain relay 23, to ground at 183, but since in the fourth controller position the contact member 92 is not in engagement with the conducting segment 81, no circuit is completed thereby.

Movement of the contact member 170 of the third chain relay 23 to its circuit closing position completes a circuit from the conductor 152 through contact member 170, conductor 184, the winding 185 of the relay 24, to ground at 186, and to the grounded terminal 103 of the battery 84, thus energizing the relay 24 and effecting, after a short time interval, upward movement of the relay contact members 161, 187, 188, 189, 191 and 192. Movement of the relay contact member 174 of the relay 23 to its upper position, connects the controller contact member 92 through conductor 194, contact member 174, conductor 195, contact member 189 of the relay 24 to the conductor 119, but since the controller contact member 92 is not in engagement with the conducting segment 81 in the fourth position of the controller, no circuit is completed thereby.

Upon movement of the relay contact member 175 to its circuit closing position, the controller contact member 91 is connected through the conductor 196 and the contact member 175 to the conductor 137, but since in this position of the controller, the contact member 91 is not in engagement with the conducting segment 81, no circuit is completed thereby. The upward movement of the relay contact member 176 interrupts the connection between the controller contact member 90 and the conductor 119 through the contact member 167 of the chain relay 22. The movement of the relay contact member 177 to its circuit closing position completes a circuit from the battery 84 through conductor 83, contact member 177, conductor 156, the winding 157 of the relay 22, to ground at 155, and to the grounded terminal 103 of the battery 84, thus energizing the lower winding 157 of the second chain relay 22. Movement of the relay contact member 178 to its upper, or circuit closing, position completes a circuit from the conducting segment 81 of the controller 17 through the contact member 94, conductor 158, contact member 178, winding 197 of the relay 24, to ground at 198, and to the grounded terminal 103 of the battery 84, thus energizing the lower winding of the fourth chain relay.

Movement of the contact member 161 of the relay 24 to its upper position interrupts the connection from the conducting segment 81 of the controller 17 to the conductor 152 through contact member 94, conductor 158, and contact member 161, through which the conductor 152 was made alive, thus deenergizing the lower winding 165 of the chain relay 21 and the upper windings 154, 172 and 185, respectively, of the chain relays 22, 23 and 24 that were energized from the conductor 152. Energization of the relay 21 is now maintained by its upper winding 131 through the contact member 128 of the relay 22, the energization of the relay 22 is maintained by its lower winding 157 through the contact member 177 of the relay 23, and the energization of the relay 24 is maintained by its lower winding 197 through the contact member 178 of the relay 23 and the controller contact member 94.

The first four chain relays, 21, 22, 23 and 24, are therefore maintained energized so long as the controller 17 remains in its fourth application position, but since the conductor 152 has now been deenergized, movement of the contact member 161 of the relay 24 to its upper position will not effect the energization of the upper winding of the relay 25, and the relays 25, 26 and 27 corresponding, respectively, to the fifth, sixth and seventh positions of the controller 17 remain deenergized. Movement of the contact member 187 to its upper position completes a circuit from the conducting segment 81 of the controller through the controller contact member 94, conductor 158, contact member 187, conductor 199, contact member 200 of the relay 25, to the conductor 119, and through the lower winding 121 of the release relay 16, to ground at 122, and to the grounded terminal 103 of the battery 84, thus maintaining the release relay 16 energized upon interruption of the circuit through the conductor 152 and the upper winding 163 of the relay.

Movement of the contact member 188 to its circuit closing position completes a circuit from the controller segment 81, through contact member 93, conductor 190, contact member 188, conductor 137, the winding of the application limiting relay 31, conductor 138, the contact member 125 of the release checking relay 29, the contact member 115 of the application checking relay 28, to ground at 139, and to the grounded terminal 103 of the battery 84, thus effecting energization of application limiting relay 31. As explained above, the relay 31, when energized, operates to close a holding circuit through its contact member 141, to interrupt the energization of the application relay 15 through the contact member 109 to thus effect operation of the application magnet valve devices to their lap position, and to close an energizing circuit for the slow release relay 12 through the contact member 142.

If either the application relay 15, or the release relay 16, fail to properly operate, or when operated, to energize the application magnet wire 13 or the release magnet wire 14, the application checking relay 28 or the release checking relay 29 will accordingly fail to be energized to complete a circuit through the winding of the application limiting relay 31, so that the circuit through the winding of the slow release relay 12 will not be completed within the time during which this relay maintains its contact member 104 in a circuit closing position, and upon movement of the contact 104 from its circuit closing position, the emergency magnet valve device 11 and the application valve device 9 will effect an emergency application of the brakes through operation of the triple valve device 6. Also, should the sequence of operation of the chain relays 21, 22, 23 and 24, as above described, fail to be completed upon movement of the controller 17 to its fourth application position, the circuit through the winding of the application limiting relay 31 will not be completed, and the slow release relay 12 will operate to interrupt the energization of the magnet valve device 11 to effect a reduction in brake pipe pressure and an emergency application of the brakes.

It will be noted that the application checking relay 28, and the release checking relay 29, are at the extreme opposite end of the train wires 13 and 14 from the application relay 15, and the release relay 16, respectively, so that should these wires become broken at any point an attempt to make a service application of the brakes would result in an emergency application through a reduction in brake pipe pressure.

If the system has operated correctly upon movement of the controller 17 to its fourth application position, the application limiting relay 31, the release relay 16, and the four chain relays 21, 22, 23 and 24, will have been energized and will remain energized so long as the controller 17 remains in its fourth application position. If the operator wishes to effect a partial reduction in braking pressure, and now operates the controller 17 to a lower, say, for example, its second application positions, thus bringing the contact members 89 and 90 into engagement with the conducting segment 81, the circuit from the conducting segment 81 through the controller contact member 94, conductor 158, contact member 178 of the relay 23, and the lower winding 197 of the relay 24 is interrupted, thus effecting the deenergization of the chain relay 24 and the operation of its several contact members 161, 187, 188, 189, 191, and 192 to their lower or illustrated positions. Upon movement of the controller 17 from its fourth application position to its second application position, the circuit for energizing the winding of the application limiting relay 31, extending from the conducting segment 81 through the contact member 93, conductor 190, the contact member 188 of the chain relay 24, to conductor 137, is also interrupted, but the energization of the relay 31 is maintained by a circuit extending from the conducting segment 81 through controller contact member 89, conductor 181, the relay contact member 168 of the relay 22, to the conductor 137 and the winding of the relay 31.

Upon movement of the controller 17 from its fourth application position, the separation of the controller contact member 94 from the conducting segment 81 interrupts the circuit therethrough for energizing the lower winding 121 of the release relay 16, thus deenergizing the relay 16 and permitting the contact member 123 to move to its circuit interrupting position, to interrupt the energization of the release magnet valve devices 3 and to effect communication from the brake cylinders 1 to the atmosphere through the exhaust ports 49.

Movement of the contact member 191 of the relay 24 to its lower, or circuit interrupting, position interrupts the circuit from the battery 84 for energizing the lower winding 182 of the chain relay 23, which, after its characteristic time interval, effects movement of its several contact members to their lower, or illustrated, positions. The movement of the contact member 177 of the chain relay 23 to its lower, or circuit interrupting, position interrupts the circuit through the lower winding 157 of the chain relay 22, through which this relay was maintained energized upon the deenergization of the conductor 152 when the controller 17 was in its fourth application position and the several chain relays 21, 22, 23 and 24 were all energized. Upon movement of the controller from its fourth application to its second application position, a circuit was completed from the conducting segment 81 through the controller contact member 90, conductor 147, and the contact member 135 of the relay 21 for also energizing the lower winding 157 of the relay 22, and this circuit is maintained, thus preventing the relay 22 from becoming deenergized upon the deenergization of the relay 23.

Upon the deenergization of the chain relay 23 and movement of its contact members to their lower positions, a circuit is completed from the conducting segment 81 of the controller 17, through controller contact member 90, conductor 147, contact member 167 of the relay 22, and contact member 176 of the relay 23 to the conductor 119 and the lower winding 121 of the release relay 16, thus energizing the release relay and causing it to move its contact member 123 to its circuit closing position, to energize the several release magnet valve devices 3 and effect movement of the release valve 47 to lap position to cut off communication from the brake cylinder 1 to the atmosphere. It will be noted, that upon movement of the controller 17 toward release position within its application zone, the release relay 16 and the release magnet valve devices 3, remain deenergized for a period depending upon the number of chain relays that are required to be deenergized in sequence, which would be two (relays 24 and 23), upon movement of the controller 17 from its fourth to its second operating position. That is, the time during which the release magnet valve devices remain deenergized is directly dependent upon the number of application positions through which the controller 17 is moved.

The operating characteristics of the chain relays 25, 26 and 27 are similar to those of the chain relays already described, and it is believed that the operation of the system will be clearly understood without further specific detailed description of different operations of the controller 17. For example, had the controller 17, when moved from its release position, been moved to its seventh, or last, application position, to effect a full application of the brakes, instead of to its fourth application position, the operation of the first four chain relays 21, 22, 23 and 24 would have been the same as above described, except that the conductor 152 would have been energized through the controller contact member 100 and the contact member 201 of the relay 27, instead of being energized through the controller contact member 94, corresponding to the fourth application position of the controller, and the contact member 161 of the relay 24, in which case movement of the contact member 161 of the relay 24 to its upper position, instead of deenergizing the conductor 152 would have energized the upper winding of the relay 25 to effect movement of its several contact members upwardly after its characteristic time interval. The contact member 202 of the relay 25 would then effect energization of the upper winding of the relay 26 to cause movement of its contact members upwardly after its characteristic time interval, and the movement of its contact member 203 would effect the energization of the upper winding of the relay 27 to cause its contact members 201, 206, 209 and 204 to be moved upwardly.

When the controller 17 is in its seventh application position, the conductor 152 is deenergized upon upward movement of the contact member 201 of the relay 27 in the same manner that it was energized upon the upward movement of the contact member 161 of the relay 24 when the controller was in its fourth application position, and the conductor 119 is energized through the contact member 201 in the same manner that it was energized upon upward movement of the contact member 187 of the relay 24. The contact member 204 is connected in series with the second contact member 205 of the next higher relay 26 between that relay and the conductor 119 in the same manner that the contact member 189 of the relay 24 is connected between the contact member 174 of the relay 23 and the conductor 119. The contact member 206 of the relay 27, effects connection between the controller conducting segment 81 and the winding of the application limiting relay 31, through conductor 137, when the controller is in its seventh application position, in the same manner as does the contact member 188 of the relay 24, when the controller 17 is in its fourth application position. The contact members 207, 208, and 209, associated, respectively, with the chain relays 25, 26 and 27, each operate to effect the energization of the lower winding of the next lower numbered relay in series, upon energization of its associated relay, thus contributing to maintain all of the several chain relays energized when the application of the brakes has been completed in response to the movement of the controller 17 to its seventh application position.

To summarize, if the operator moves the controller 17 to a brake applying position, both the application relay 15 and the release relay 16 are energized, and effect the energization of the application magnet valve devices 2 and the release magnet valve devices 3, causing the brakes to be applied. The relays 15 and 16 also respectively effect the energization of the application checking relay 28 and the release checking relay 29. The application limiting relay 31 must be energized to limit the degree of application of the brakes, and its energizing circuit extends through the contact members of the application relay 28 and the release relay 29, which checks the fact that both the application magnet wire 13 and the release magnet wire 14 have been properly energized. In case the wires 13 and 14 have not been properly energized, the application checking relay 28, or the release checking relay 29, will not operate and the application limiting relay 31 will not be energized to effect the energization of the slow release relay 12, which will then operate to interrupt the energization of the emergency magnet valve device and cause an emergency application of the brakes.

Subsequent advances of the controller 17 effect the deenergization of the relay 31, which will be energized again to limit the degree of application of the brakes in accordance with the movement of the controller 17. At each advance of the controller 17, a check circuit is, therefore, completed through the contact members of the relays 28 and 29, indicating that the wires 13 and 14 have been properly energized. The degree of energization of the brakes, upon movement of the controller 17, is determined by the number of controller steps through which it is moved, and the number of chain relays 21 to 27 corresponding to the controller steps that must operate before the application limiting relay 31 is energized. The chain relays 21 to 27 inclusive, have slight time delay characteristics and operate in sequence, so that the application relay 15 is energized, upon any movement of the controller 17 in a direction to effect application of the brakes, for a time proportional to the number of chain relays that must operate to limit the brake application, and the release relay 16 is deenergized when the controller 17 is moved in a direction to effect a release of the brakes for a period of time that is proportional to the number of chain relays that are required to operate to effect a correspondence between the relays and the controller.

The slow release relay 12 is maintained energized in the release position of the controller 17, and upon movement of the controller to an application position, for a sufficient length of time after it leaves its release position to permit all of the several relays 21 to 27 to operate in sequence. Upon completion of the proper operation of the several sequence relays to correspond to the movement of the controller 17, a circuit is completed through the winding of the slow release relay 12 maintaining it energized. Should the relays fail to operate properly, this maintaining circuit will not be completed and the relay 12 will, after a time interval of say one second, operate to effect an emergency application of the brakes. If the controller 17 is moved toward release position, the release relay 16 is deenergized and the relay 31 is maintained energized to effect the flow of fluid under pressure from the brake cylinder for a time dependent upon the number of steps through which the controller 17 has been moved, at which time the relay 16 is again energized to effect the energization of the release magnet valve devices 3 and prevent further release of the brakes.

While I have illustrated and described one preferred embodiment of my invention, it will be apparent that many modifications thereof may be made within the spirit of my invention, and I do not wish to be limited otherwise than by the scope of the appended claims.

Having now described my invention, what I claim as new and desire to secure by Letters Patent, is:

1. In a brake equipment for vehicles, electroresponsive means for effecting an application of the brakes, manually operable means having a plurality of brake applying positions for controlling said electroresponsive means to effect a desired degree of application of the brakes, and checking means operative upon movement of said manually operable means to any brake applying position for indicating an operation of said electroresponsive means in correspondence with the operation of said manually operable means.

2. In a brake equipment for vehicles, electroresponsive means for effecting an application of the brakes, manually operable means having a plurality of brake applying positions for controlling said electroresponsive means to effect the desired degree of application of the brakes, checking means operative upon movement of said manually operable means to any brake applying position for indicating an operation of said electroresponsive means in correspondence with the operation of said manually operable means, and means responsive to a lack of correspondence between the movement of said manually operable means and said electroresponsive means for effecting an emergency application of the brakes.

3. In a brake equipment for vehicles, electroresponsive means for effecting an application of the brakes, manually operable means having a plurality of brake applying positions for controlling said electroresponsive means to effect a desired degree of application of the brakes, electric circuit means for energizing said electroresponsive means, means for modifying the condition of said electric circuit means after a predetermined time depending upon the amount of movement of said manually operable means from its brake releasing position to determine the degree of application of the brakes, and checking means for indicating a correspondence between the condition of said electric circuit means and the operation of said manually operable means.

4. In a brake equipment for vehicles, electroresponsive means for effecting an application of the brakes, manually operable means having a plurality of brake applying positions for controlling said electroresponsive means to effect a desired degree of application of the brakes, electric circuit means for energizing said electroresponsive means, means for modifying the condition of said electric circuit, means operable after a predetermined time depending upon the amount of movement of said manually operable means from its brake releasing position to determine the degree of application of the brakes, checking means for indicating a correspondence between the operation of said manually operable means and the condition of said electric circuit means, and means operable upon a lack of correspondence between said manually operable means and said electric circuit means for effecting an emergency application of the brakes.

5. In a railway train brake system, the combination with an electropneumatic brake apparatus, of electric control circuits extending throughout the train and connected to said apparatus, manually operable means for controlling the electric control circuits, a checking circuit and a plurality of electric timing relays operable in sequence upon the energization of said control circuits in accordance with the operation of said manually operable means for closing said checking circuit to indicate the integrity of said electric circuits.

6. In a railway train brake system, the combination with an electropneumatic brake apparatus, of electric control circuits extending throughout the train and connected to said apparatus, manually operable means for controlling said electric circuits, electroresponsive means energized through said control circuits upon movement of said manually operable means to a brake applying position, electric timing relays operable upon the energization of said control circuits in accordance with the operation of said manually operable means to indicate the integrity of said electric circuits, and means responsive to a failure in said electric control circuits for effecting an emergency operation of the brakes.

7. In a railway train brake system, the combination with an electropneumatic brake apparatus, means for controlling the application and release of the brakes comprising an application relay, a release relay, and electric control circuits controlled thereby extending throughout the train and connected to said apparatus, manually operable means for controlling said application and release relays, and electric checking relays operable upon the energization of said control circuits an amount dependent upon the amount of movement of said manually operable means to indicate the integrity of said electric circuits.

8. In a railway train brake system, the combination with an electropneumatic brake apparatus, of means for controlling the application and release of the brakes comprising an application relay, a release relay, and electric circuits controlled thereby extending throughout the train and connected to said apparatus, manually operable means for controlling said application and release relays, electric relays operable upon the energization of said circuits in accordance with the operation of said manually operable means to indicate the integrity of said circuits, and means responsive to a failure in said electric circuits for effecting an emergency application of the brakes.

9. In a railway train brake system, the combination with an electropneumatic brake apparatus, means for controlling the application and release of the brakes comprising an application relay, a release relay, and electric circuits controlled thereby extending throughout the train and connected to said apparatus, manually operable means for controlling said application and release relays, an application checking relay and a release checking relay responsive, respectively, to the energization of the application and release controlling electric circuits, and an application limiting relay responsive to the movement of said manually operable means for effecting the degree of application of the brakes.

10. In a railway train brake system, the combination with an electropneumatic brake apparatus, of means for controlling the application and release of the brakes comprising an application relay, a release relay, and electric circuits controlled thereby extending throughout the train and connected to said apparatus, manually operable means for controlling said application and release relays, an application checking relay and a release checking relay, responsive to the energization of the application and release controlling electric circuits, an application limiting relay and time delay control means therefor responsive to the amount of movement of said manually operable means for determining the degree of application of the brakes, and means responsive to a failure in the proper operation of said application checking relay, said release checking relay, or said application limiting relay, to effect an emergency application of the brakes.

11. In a railway train brake system, the combination with an electropneumatic brake apparatus, of means for controlling the application and release of the brakes comprising an application relay, a release relay, and electric circuits controlled thereby extending throughout the train and connected to said apparatus, manually operable means for controlling said application and release relays, an application checking relay, a release checking relay, responsive, respectively, to the energization of the application and release controlling electric circuits, time delay means operable in accordance with the amount of movement of said manually operable means, and an application limiting relay controlled by said application and release relays and responsive, after a time interval as determined by said time delay means for maintaining the brakes applied.

12. In a railway train brake system, the combination with an electropneumatic brake apparatus, of means for controlling the application and release of the brakes comprising an application relay, a release relay, and electric circuits controlled thereby extending throughout the train and connected to said apparatus, manually operable means for controlling said application and release relays, an application checking relay, a release checking relay, responsive respectively to the energization of the application and release controlling circuits, a plurality of chain relays operable in sequence in accordance with the amount of movement of said manually operable means, and an application limiting relay controlled by said application and release relays and responsive, after a time interval determined by operation of said chain relays for maintaining the brakes applied, and means responsive to a failure in the proper operation of said application checking relay, said release checking relay, or said application limiting relay, to effect an emergency application of the brakes.

13. In a railway train brake system, the combination with an electropneumatic brake apparatus, of means for controlling the application and release of the brakes comprising an application relay, a release relay, and electric circuits controlled thereby extending throughout the train and connected to said apparatus, manually operable means for controlling said application and release relays, an application checking relay and a release checking relay responsive, respectively, to the energization of the application and release controlling circuits, a plurality of chain relays operable in sequence in accordance with the operation of the manually operable means, and an application limiting relay responsive to an operation of said chain relays for maintaining the brakes applied.

14. In a brake equipment for vehicles, a fluid pressure brake, a brake pipe, means responsive to the fluid pressure in said brake pipe for controlling the operation of the brake, electroresponsive means comprising a series of timing relays for controlling the operation of the brake, means including a manually operable device for controlling the operation of said electroresponsive means to effect a degree of application of the brake in accordance with the position of said manually operable means, and means operable in any position of said manually operable means and responsive to a failure in the operation of said electroresponsive means in correspondence with the movement of said manually operable device for effecting a reduction in brake pipe pressure to cause operation of said fluid pressure responsive means to effect an emergency application of the brake.

15. In a brake equipment for vehicles, a fluid pressure brake, a brake pipe, means responsive to the fluid pressure in said brake pipe for controlling the application of the brake, electroresponsive means comprising an application magnet valve device and a release magnet valve device for controlling the application of the brake, means including a manually operable device for controlling the operation of said electroresponsive means to effect an application of the brake in accordance with the position of said manually operable means, application and release checking relays operable respectively upon the energization of the circuits for controlling said application and release magnet valve devices, and means responsive to a failure in the operation of said checking relays for effecting a reduction in brake pipe pressure to cause operation of the fluid pressure responsive means to effect an emergency application of the brake.

16. In a brake equipment for vehicles, a fluid pressure brake, a brake pipe, fluid pressure responsive means subject to brake pipe pressure for controlling the application of the brake, electroresponsive means for controlling the application of the brake, manually operable means for controlling the operation of said electroresponsive means to effect an application of the brake in accordance with the position of said manually operable means, checking relays operable upon the energization of the circuits for controlling said electroresponsive means, time delay means operable at a time interval after operation of said manually operable means for limiting the degree of application of the brake, and means responsive to the improper operation of said electroresponsive means for effecting a reduction in brake pipe pressure to cause operation of said fluid pressure responsive means to effect an emergency application of the brake.

17. In a brake equipment for vehicles, a fluid pressure brake, a brake pipe, fluid pressure responsive means subject to brake pipe pressure for controlling the application of the brake, electroresponsive means for controlling the application of the brake, means including a manually operable device for controlling the operation of said electroresponsive means to effect an application of the brake in accordance with the position of said manually operable means, checking relays operable upon the energization of the circuits controlling said electroresponsive means, means for limiting the degree of application of the brake including time delay means operable in accordance with the operation of said manually operable means, an application limiting relay controlled by said time delay means and by said checking relays, and means responsive to a failure in the operation of said application limiting relay for effecting a reduction in brake pipe pressure to cause operation of said fluid pressure responsive means to effect an emergency application of the brakes.

18. In combination, a chain of slow pick-up relays, a manually operable controller having pairs of normally open contacts, one pair corresponding to each of said relays and each pair having a pick-up contact and an operating contact, a plurality of pick-up circuits for the first relay of said chain, each including one of said pick-up contacts and a back contact of the relay associated with such contact, a plurality of pick-up circuits for each relay beyond the first, each including a front contact of the preceding relay and a back contact of one of the succeeding relays as well as the controller pick-up contact associated with such succeeding relay, a holding circuit for each relay including a front contact of the next succeeding relay, an auxiliary holding circuit for each relay except the first and each including the associated pick-up contact and a front contact of the preceding relay, an electroresponsive device, and a plurality of operating circuits for said device, each including a front contact of one of said relays and the operating contact corresponding to such relay.

19. In a vehicle braking system, in combination, a chain of slow pick-up relays, a manually operable controller having pairs of normally open contacts, one pair corresponding to each of said relays and each pair having a pick-up contact and an operating contact, a plurality of pick-up circuits for the first relay of said chain, each including one of said pick-up contacts and a back contact of the relay associated with such contact, a plurality of pick-up circuits for each relay beyond the first, each including a front contact of the preceding relay and a back contact of one of the succeeding relays as well as the controller pick-up contact associated with such succeeding relay, a holding circuit for each relay including a front contact of the next succeeding relay, an auxiliary holding circuit for each relay except the first and each including the associated pick-up contact and a front contact of the preceding relay, an electroresponsive device, and a plurality of operating circuits for said device each including a front contact of one of said relays and the operating contact corresponding to such relay, and braking apparatus for the vehicle controlled in part by said electro-responsive device.

20. In a brake equipment for vehicles, in combination, electroresponsive means for effecting an application of the brakes comprising magnet valve devices and means for controlling the duration of energization of said electroresponsive means comprising a plurality of timing relays arranged to operate in sequence, manually operable means having a plurality of brake applying positions corresponding to the number of timing relays for controlling the operation of a chosen number of said timing relays to effect a desired degree of application of the brakes in accordance with the amount of movement of said manually operable means, and means responsive to a lack of correspondence between the movements of said manually operable means and said timing relays for effecting emergency application of the brakes.

GEORGE W. BAUGHMAN.